United States Patent [19]

Mayr et al.

[11] Patent Number: 4,627,238
[45] Date of Patent: Dec. 9, 1986

[54] OUTPUT CONTROL APPARATUS FOR A HYDROSTATIC DRIVE WITH DELIVERY ADJUSTMENT

[75] Inventors: Albert Mayr, Senden; Oskar Stickel, Langenau, both of Fed. Rep. of Germany

[73] Assignee: Hydromatik GmbH, Elchingen, Fed. Rep. of Germany

[21] Appl. No.: 660,384

[22] Filed: Oct. 12, 1984

[30] Foreign Application Priority Data

Nov. 8, 1983 [DE] Fed. Rep. of Germany ....... 3340332

[51] Int. Cl.$^4$ ............................................. F16D 31/02
[52] U.S. Cl. ........................................ 60/452; 417/218
[58] Field of Search ............... 417/213, 216, 218, 222; 60/452, 445, 444, 447

[56] References Cited

U.S. PATENT DOCUMENTS

| | | | |
|---|---|---|---|
| 3,732,036 | 5/1973 | Busbey et al. | 417/216 |
| 3,788,774 | 1/1974 | Roesslein | 417/218 |
| 4,011,721 | 3/1977 | Yip | 60/445 |
| 4,292,805 | 10/1981 | Acheson | 417/218 X |
| 4,498,847 | 2/1985 | Akiyama | 417/216 |

FOREIGN PATENT DOCUMENTS 140583  8/1982  Japan ................................ 417/216

*Primary Examiner*—Edward K. Look
*Attorney, Agent, or Firm*—Scully, Scott, Murphy & Presser

[57] ABSTRACT

An output control apparatus for a hydrostatic drive in open circuit is described which has a device for regulating the delivery of the hydraulic pump. In addition to conventional output control by way of an output valve, the arrangement of an additional control piston which acts on the spool of the output valve provides the possiblity of adjusting the delivery as a function of the restoring pressure of a load during its working movement in a return direction, with reduced power consumption.

2 Claims, 1 Drawing Figure

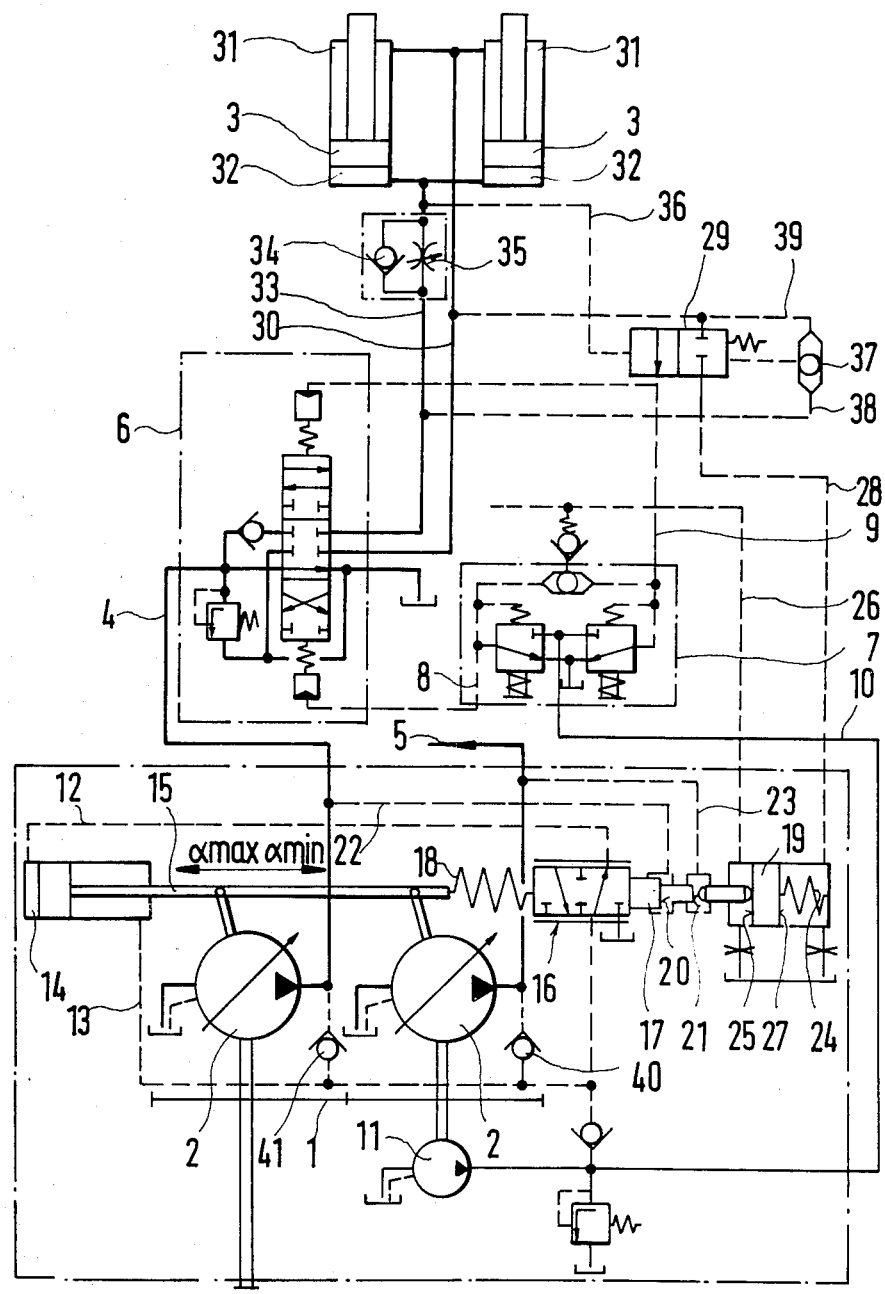

OUTPUT CONTROL APPARATUS FOR A HYDROSTATIC DRIVE WITH DELIVERY ADJUSTMENT

TECHNICAL FIELD OF THE INVENTION

The invention relates to an output control apparatus for a hydrostatic drive in open circuit, having a device for regulating the delivery of the hydraulic pump of the drive, consisting of a regulating piston which can be acted upon by a regulating pressure and which butts against a path measuring spring, the other side of which acts on the spool of an output valve which controls the regulating pressure acting on the regulating piston and in which the spool is acted upon by the pressure of the working medium of the gearing against the force of the path measuring spring.

BRIEF DESCRIPTION OF THE PRIOR ART

Such output control apparatus are generally known. Such a control apparatus for the simultaneous, dependent control of several pumps is described, for example, in DEAS No. 20 38 968. Such a control apparatus is also suitable for the control of a single pump.

Normally, output- or pressure-controlled adjustable hydraulic pumps are kept at the maximum delivery setting by means of spring systems or by means of the springs which act on the regulating piston of the regulating device. As the pressure of the working medium delivered by the hydraulic pump increases, the hydraulic pump is adjusted to a reduced delivery in accordance with the control characteristic of the apparatus, by means of an appropriate control system, for example, a control apparatus of the type cited as known above. This means that even if the total delivery of the hydraulic pump is not required for the load which is driven by the hydrostatic drive, the maximum delivery is delivered by the hydraulic pump. Considerable losses are, therefore, caused as a result of unnecessarily delivering the maximum delivery of the hydraulic pump of a hydrostatic drive of this type.

Particularly in the case of building and earth moving machinery driven by means of such hydrostatic drives it is more than ever important today that the demands made are met using the least possible energy. It must be possible to make the maximum use of the installed power with economy of fuel.

The invention described below utilizes the knowledge that in the case of hydrostatic drives in open circuit such as are used, for example, for excavators, cranes or other building machinery, the working piston, which is acted upon on both sides by working medium for moving a load forward and back, was hitherto treated in the same manner in both directions of movement with regard to the power input of the hydrostatic drive and of its hydraulic pump respectively. In other words, there used to be full power input by the hydraulic pump even during return movement of the load(s), even though it is not required for these movements.

OBJECT OF THE INVENTION

The underlying object of the invention is to combine an output control apparatus of the type referred to initially with delivery adjustment, in such a way that with back and return movements of a load driven by the hydrostatic drive, there is no input of waste power as a result of delivering an excessive and unnecessary volume.

BRIEF DESCRIPTION OF THE INVENTION

In order to achieve this object, an output control apparatus of the type referred to initially is characterized in that when the hydraulic pump is not under load, the valve spool is pre-stressed against the path measuring spring in the "minimum delivery" switch position, in that there is associated with the spool a control piston which is held against the force of the path measuring spring in contact with the spool by means of a pressure spring, and the pressure spring holds the spool in the direction of the "minimum delivery" switch position of the hydraulic pump, the control piston having a first piston area which can be acted upon against the force of the pressure spring by an adjustable control pressure which determines the power consumption of a load driven by the hydrostatic drive, and the control piston having a second piston area which can be acted upon in the direction of the force of the pressure spring by a restoring pressure which corresponds to a prescribed working pressure when there is a return movement of the load with reduced power consumption.

It is known per se to pre-stress the spool of the output valve against the path measuring spring in the "minimum delivery" switch position when the hydraulic pump is not under load.

This pre-stressing of the valve spool against the force of the path measuring spring may take place in various ways, for example by means of a spring which pre-stresses the regulating piston of the regulating device in the direction of minimum delivery of the hydraulic pump, or by forming the regulating piston as a piston which may be acted upon on both sides and which has different piston areas, so that a regulating pressure corresponding to the minimum delivery acts on the greater of the two piston areas and holds the regulating piston in the direction of minimum delivery.

Through the association, as proposed by the invention, of a control piston with a pressure spring with the spool of the output valve, it is possible in a simple manner on the one hand to control the hydraulic pump in terms of volume, as a function of the adjustable control pressure of a load driven by the hydrostatic drive, i.e. to adjust it with regard to delivery. For this purpose, the adjustable control pressure of the load is transmitted to the first piston area of the control piston against the pressure spring. On the other hand, it is possible to restore the flow of the hydraulic pump as a function of the filling pressure for the back or return movement at the hydraulic motor of the hydrostatic drive, so that during a return movement of the load there is no unnecessary input of power by the hydraulic pump. This takes place as a result of the restoring pressure being transmitted to the second piston area of the control piston in the direction of the force of the pressure spring. The underlying concept of the invention, therefore, consists in utilizing the restoring pressure as measurable variable for setting and resetting the delivery of the hydraulic pump.

If the hydraulic motor of the hydrostatic drive is formed as a working piston which is acted upon on both sides by a working medium for moving a load forward and back, then an advantageous embodiment of the invention is characterized in that there is connected with the working pressure line for the supply of working media to the working piston in the direction of a back or return movement of the load a control valve which opens as a function of the working pressure in the working pressure line to the working piston in the direction of forward movement of the load, and transmits the working pressure for the return movement of the load as restoring pressure to the second piston area of the control piston. The control valve transmitting the restoring pressure to the control piston is, therefore, controlled by the working pressure of the working medium for the forward movement at the hydraulic motor. An advantageous embodiment is characterized in that there is arranged in the working pressure line to the working piston in the direction of a forward movement of the load a non-return valve which opens towards the working piston and which has a restrictor in parallel therewith, and the pressure difference resulting before and after the restrictor with back or return movement of the working piston is used as switching pressure for the control valve to open.

BRIEF DESCRIPTION OF THE DRAWINGS

An exemplary embodiment of the invention is described in greater detail in the following with reference to the attached drawing. The single FIGURE shows a diagrammatic representation of a hydrostatic drive with output and delivery control.

DETAILED DESCRIPTION OF A PREFERRED EMBODIMENT OF THE INVENTION

The hydrostatic drive comprises two hydraulic pumps 2 (likewise one or several pumps may be provided) which are driven by means of a driving motor (not shown) by way of a gearing 1, and a hydraulic motor consisting of two working pistons 3 which may be acted upon on both sides (likewise only one or even several working pistons may be provided). The hydraulic pumps 2 and the working pistons 3 are connected in an open circuit by way of working pressure lines 4 as hydrostatic drive, in the embodiment shown the right hydraulic pump 2 delivering into another working pressure line 5 which supplies a load (not shown). There is arranged in the working pressure line 4 leading to the working pistons 3 a regulating device of a known type, which is indicated generally by 6 and which is not described in greater detail here as it is known and is not essential for the invention. The regulating device 6 is triggered by means of a transmitting device 7 comprising directional valves by a control pressure in the lines 8, 9 in order to control in a manner which is known and which is not essential for the invention the supply of working pressure medium to the working pistons 3 and to prescribe their rate of movement and their direction. The directional valves in the transmitting device 7 are provided in a known manner with a control pressure medium through a line 10 for the purpose of prescribing in an adjustable manner the desired control pressure for the individual loads, which line supplies a control pressure medium from an auxiliary pump 11 driven by the gearing 1.

The device for adjusting the delivery of the hydraulic pump(s) 2 with pressure-dependent output control comprises a regulating piston 14 which can be acted upon on both sides by way of control lines 12,13 and which is coupled in a form-locked manner with the adjusting levers for adjusting the delivery of the pumps 2 by way of a rod 15. 16 denotes an output valve of which the spool 17 is acted upon on the one side by a path measuring spring 18 which serves at the rod 15 and the regulating piston 14 respectively to detect the regulating distance and the delivery adjustment of the pumps. A control piston 19 rests against the spool 17 of the output valve 16 on the other side. On the same side of the spool 17 there are formed control surfaces 20, 21 which are connected by way of lines 22,23 with the working pressure lines 4,5. The control piston is pre-stressed against the spool 17 by means of a pressure spring 24 which exceeds the force of the path measuring spring 18 and which may exert excess pressure on this.

The control piston 19 has a first piston area 25 which can be acted upon by way of a line 26 by the highest of the adjustable control pressures at the directional valves of the transmitting device 7 and which acts against the pressure spring 24. The control piston 19 was a second piston area 27 in the direction of the pressure spring 24 which is connected by way of a pressure line 28 with a control valve 29.

In its open position the control valve 29 connects the pressure line 28 with the working pressure line 30 which leads to the cylinder spaces 31 of the working pistons 3, which are associated with the smaller piston area of the working pistons 3 for the back or return movement of the load which is driven by the working piston(s). The cylinder spaces 32 which are associated with the larger piston areas of the working pistons 3 are connected with a working pressure line 33 in which there is arranged a non-return valve 34 which is open to the cylinder spaces 32 and which has an adjustable restrictor 35 in parallel therewith. The slide of the pressure regulating valve 29 is connected on the one hand by way of a control line 36 with the working pressure line 33 for the forward movement of the working pistons 3 after the restrictor 35 and, on the other hand, the slide of the control valve 29 is connected by way of a shuttle valve 37 and a control line 38 either with the working pressure line 33 or by way of a line 39 with the working pressure line 30 for the return movement of the working pistons 3.

In the embodiment represented, the regulating pressure, which is adjustable by means of the output valve 16 in the control lines 12 and 13 leading to the cylinder space of the regulating piston 14, is derived by way of non-return valves 40, 41 from the working pressure lines 4,5. The regulating pressure medium for adjusting the regulating pressure could also be derived from the line 10 issuing from the auxiliary pump 11. It should be pointed out also that the function of the pressure spring 24 can also be assumed by the action of an auxiliary pressure supplied to the cylinder space facing the second piston area 27.

The function of the control apparatus described above is the following: At a standstill, i.e. when the hydraulic pumps 2 are not being driven, they are adjusted to maximum delivery by displacement of the rod 15 to the left in the drawing under the force of the spring 24, as there are no regulating pressures acting on the regulating piston 14. If the hydraulic pumps 2 are driven by the driving motor (not shown) and by the gearing 1, there builds up in the control lines 12, 13 by way of the working pressure lines 4 and 5 respectively and the non-return valves 40 and 41 respectively a regulating pressure which moves the regulating piston 14 and hence the rod 15, pressing the path measuring spring 18 to the right in the drawing, as the piston area on the left side of the regulating piston 14 is greater than on the right side. The spool 17 of the output valve 16 remains on the left in the position shown, i.e. circulation of the regulating pressure medium in the lines 12, 13. The pressure spring 24 holds the spool 17 in the left position indicated against the force of the compressed path measuring spring 18. Both pumps are reset to minimum delivery. When a load (working piston 3) is connected to the transmitting device 7, the regulating pressure for connection of the load is transmitted to the first piston area 25 of the control piston 19 by way of the line 26. This regulating pressure acts against the pressure spring 24 and weakens its effect on the spool 17, with the result that the spool 17 can move to the right in the drawing, releasing the regulating pressure medium in the line 12 to the outlet, with the result that by outweighing the regulating pressure in the regulating pressure line 13, the regulating piston 14 is moved to the left in the drawing in the direction of greater delivery of the hydraulic pumps. The hydraulic pumps are, therefore, controlled in terms of delivery and are run to capacity, subject to the control pressure triggering the load.

Limiting output control of the hydraulic pumps 2 takes place in a known manner in that the working pressure in the working pressure lines 4 and/or 5 acts by way of the respective lines 22, 23 on the control areas 20 and/or 21 on the spool 17 and moves the spool 17 against the force of the path measuring spring 18 into the left position in the FIGURE, so that a regulating pressure builds up in the regulating pressure line 12 which moves the piston 14 to the right in the direction of reduced delivery of the pumps. The path measuring spring 18, therefore, acts as output measuring spring here. This output control takes precedence over the delivery control described above, as with the onset of output control the spool 17 is lifted off the control piston 19.

If, by adjustment at the transmitting device 7 and corresponding adjustment at the regulating device 6, the load (working piston 3) is adjusted to return movement by supplying the working pressure line 30 with working pressure medium accordingly, then, from practical experience, a lower output from the hydrostatic drive is required for this return movement. It is forced back by reducing the working pressure in the line 33. As a result, the control valve 29 is opened, and the working pressure in the working pressure line 30 for the restoring movement reaches by way of the line 28 the cylinder space facing the second piston area 27 of the control piston 19. The force of the spring 24 is assisted and the spool 17 of the output valve 16 is moved to the left, so that the hydraulic pumps 2 are moved in the direction of reduced delivery in accordance with the output control described above. Only as much working medium is still delivered as is required to maintain in the cylinder spaces 31 of the working pistons 3 the pressure necessary for the return movement. Waste output as a result of delivering unnecessary quantities of working pressure medium during the restoring process is avoided.

What is claimed is:

1. Output control apparatus for a hydrostatic drive in an open circuit having a device for regulating the delivery of a hydraulic pump of the drive, including a regulating piston having a piston surface acted upon by a regulating pressure; a path measuring spring having one end biased against said regulating piston; an output valve having a spool subjected to a biasing action from the other end of said path measuring spring, said output valve controlling the regulating pressure acting on the regulating piston; said drive being connected to said pump, said spool of said output valve being subjected to the pressure of the working medium of the hydrostatic drive against the force of the path measuring spring, said spool being stressed against the path measuring spring in the "minimum delivery" switch position when said hydraulic pump is not under load, a control piston being operatively connected with said spool; a pressure spring retaining said control piston against the force of the path measuring spring in contact with said spool, and said pressure spring holding the spool in the direction of the "minimum delivery" switching position of the hydraulic pump, means for subjecting a first piston area of said control piston to an adjustable control pressure against the force of the pressure spring, which pressure determines the power consumption of a load which is driven by the hydrostatic drive, means for imparting a restoring pressure to a second piston area of said control piston in the direction of the force of the pressure spring, in which the restoring pressure corresponds to a prescribed working pressure when there is a return movement of the load with reduced power consumption, said hydrostatic drive including a working piston having first and second areas subjected to a working medium for moving a load back and forth; a control valve being connected with a pressure line for the supply of said working medium to said working piston for effecting a return movement of the load; and a contact valve opening responsive to the working pressure in a pressure line connected to the working piston for effecting a forward movement of the load and transmitting the working pressure for the return movement of the load as a restoring pressure to the second piston area of the control piston.

2. Control apparatus according to claim 1, wherein a non-return valve is positioned in the pressure line for the supply of working media for effecting the forward movement of the load to the working piston, said non-return valve opening towards the working piston and having a restricting point connected in parallel therewith, wherein the pressure difference resulting upstream and downstream of the restricting point during the reciprocating movement of the working piston constitutes an adjusting pressure for effecting the openings of said control valve.

* * * * *